United States Patent Office 3,464,000
Patented Aug. 26, 1969

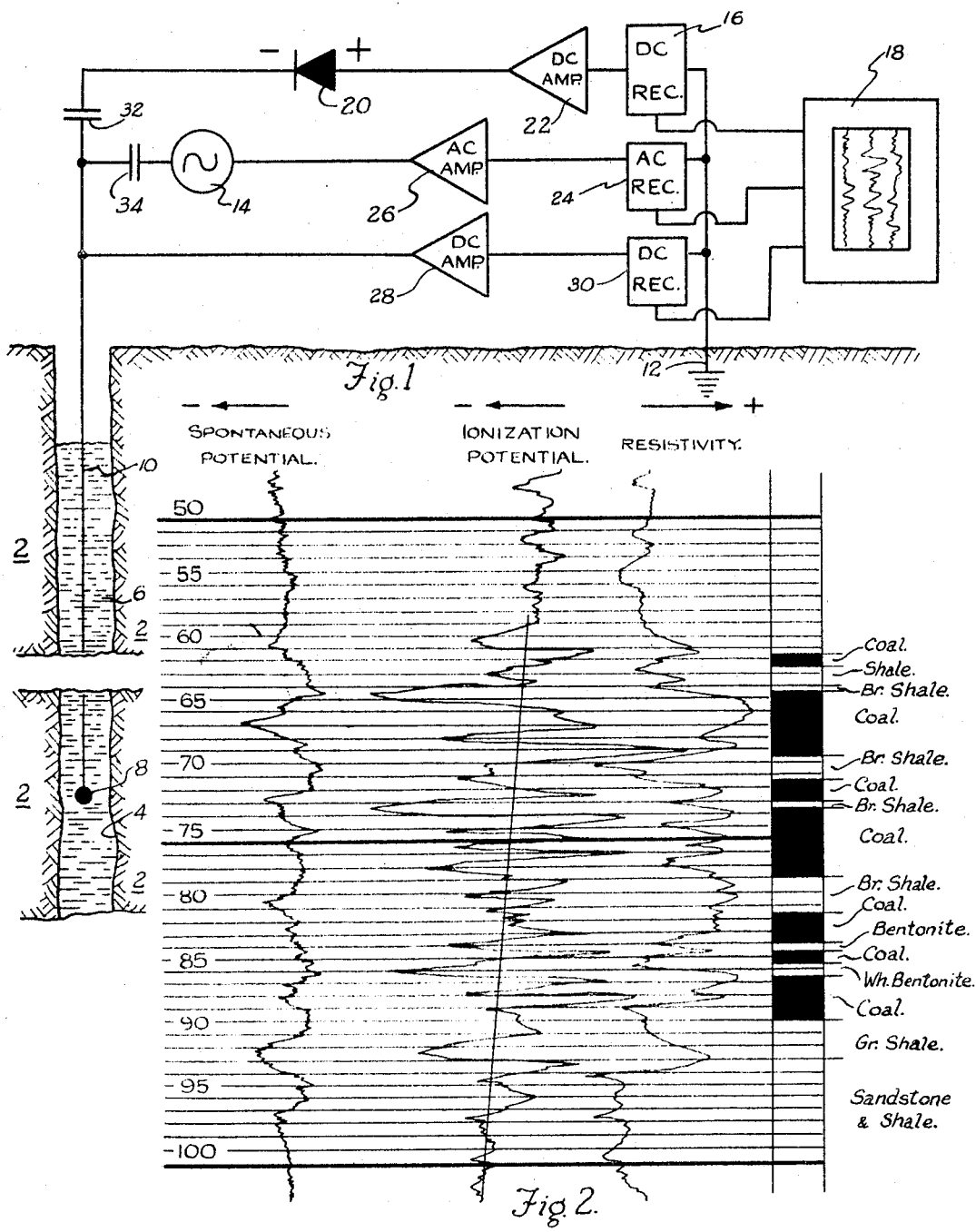

3,464,000
METHOD AND APPARATUS FOR LOGGING WELL BORES UTILIZING A PULSATING D.C. SIGNAL
Donald Theodore Ower, 8612 80th St., Edmonton, Alberta, Canada
Filed Oct. 12, 1965, Ser. No. 495,240
Int. Cl. G01v 3/18
U.S. Cl. 324—1                                    28 Claims

ABSTRACT OF THE DISCLOSURE

A method and apparatus for investigating subsurface earth formations traversed by a bore hole in which a unidirectional, varying-amplitude, electrical signal, preferably having an amplitude of 50 to 500 millivolts and a frequency of about 50 to 300 c.p.s., is passed through the earth formation of interest and simultaneously with the passage of the signal through the earth a unidirectional, varying-amplitude, electrical signal of a polarity opposite to the polarity of the exciting signal is measured across the earth formation of interest. The opposite polarity measurement is preferably accomplished by utilizing a polarized DC potentiometer having a polarization opposite that of the signal generator. A novel measurement of the resistivity of the formation in question may also be obtained by simultaneously measuring the resistivity across the formation of interest simultaneously with the excitation of the formation and the measurement of the opposite polarity signal. It is also possible to measure a conventional self-potential effect in the formation of interest and to record the opposite polarity log, the modified resistivity log, and the self-potential log in side-by-side relation. The method and apparatus has been found particularly useful in the evaluation of underground coal deposits.

---

The present invention relates to a method and apparatus for indicating the location and the nature of subterranean materials. More specifically, the present invention relates to a novel method and apparatus for electrically determining the location and nature of subterranean materials. Still more specifically, the present invention relates to a method and apparatus for electrically determining the depth below the surface of the earth of materials forming the walls of a bore hole leading from the surface of the earth, determining the nature of such materials, and correlating particular materials from one bore hole to another to thereby outline the areal extent of particular deposits of such materials.

In the art of exploration for subterranean deposits of valuable minerals many techniques and devices have been developed which give information concerning the probability that a valuable deposit exists at a particular depth below the surface of the earth; the probability that this material is of one broad type rather than another; the extent to which a particular type of subsurface formation can be found over a given geographic area; the general nature of the fluids contained in subterranean formations; and, to a very limited extent, as will be hereinafter pointed out, the chemical constituency of the formations and the fluids contained therein. While surface measurements have generally been found useful to indicate the probability of a formation beneath the surface of the earth and to follow the depth variations of such formations over a considerable geographical area, it is still necessary to actually drill a bore hole to the formation of interest in order to obtain any definitive information concerning its value. Of course, the ultimate measure of the value of a particular subsurface deposit can be determined by obtaining a sample of the material and chemically analyzing it. However, such sampling is not always possible and it is totally impractical to drill sampling holes in the dense fashion that would be necessary to obtain accurate information over an extended geographical area. Consequently, operators have resorted to what is known as logging of a test bore hole or a limited number of bore holes located over a broad areal extent. While a wide variety of logging methods and devices have been suggested, one of the first and still the most commonly used is what is known as electrical well logging. Electrical well logging includes two general classes of measurement.

One of the basic electrical logs is the spontaneous potential log or SP log. The spontaneous potential log of a bore hole is a record of potentials measured in the fluids disposed in the bore hole, usually the mud utilized in drilling the bore hole. These potentials are measured between an electrode lowered into the bore hole and another electrode grounded at the surface. Spontaneous potential anomalies in a bore hole are due primarily to the electromotive forces generated by two different electrical phenomena. The first of these, and the more important, is the electrochemical cell formed between the drilling fluid and the fluid in a permeable formation forming the walls of the bore hole, between the fluid in the permeable formation and impermeable formations forming the wall of the hole and between the impermeable formation and the drilling fluid. The second of these electromotive forces results from the filtration or flow of the drilling fluid into a permeable zone. This principle is a recognized phenomenon of electrochemistry known as streaming potential. There are many other factors effective in generating natural bore hole potentials but, at present, the phenomena mentioned appear to be those of major importance. Whatever their origin may be (electrochemical or electrokinetic) the electromotive forces give rise to a current which flows through permeable layers then spreads into adjacent impervious formations and returns through the mud filling the hole. The SP anomalies correspond to the drop of potential created by the circulation of the current in the hole and thus measure only a part of the total electromotive forces. Consequently, the characteristics of the SP log, and particularly the amplitude of the anomalies, are a function of several factors, such as, the salinity of the fluid in the hole and the formation fluids, the resistivity of the surrounding formation, the thickness of a particular formation, the hole diameter, the depth the bore hole fluid has invaded the formation and the amount of shaley material in a permeable bed. In any event, the spontaneous potential log is generally used to distinguish between permeable and non-permeable formations as, for example, sand and shale and permeable and non-permeable limestones. However, a quantitative relationship between porosity or permeability and the measured spontaneous potentials does not exist. Since the SP log is generally flat in front of impermeable shale formations and shows positive or negative anomalies opposite permeable beds it is generally the practice, and a convenient one, to take an arbitrary line or constant in front of a shale as a base line. Therefore, when utilizing this base line, the spontaneous potential curve developed opposite a permeable, water-bearing formation is usually very small, frequently non-existent and sometimes reversed as compared with the SP across a salt water-bearing formation. Since most drilling fluids are comparatively fresh and since the electrochemical effect has been recognized as being the preponderant EMF, it can be shown that, when the resistivity of the drilling fluid is appreciably higher than that of the formation water, the SP is negative; when the two are the same, the SP is zero; and, when the drilling fluid resistivity is lower than the formation water resistivity, the SP is positive. Therefore, in the case of fresh water sands and a fresh drilling fluid, the spontaneous potentials are usually small. The spontaneous potential developed by a salt water-bearing formation is generally sharp, having an appreciable magnitude up to 100 or 200 mv, and is negative with respect to the shale base line. As noted previously, there is no quantitative relation between SP and porosity or permeability. However, marked variations in the magnitude of the spontaneous potential generally are associated with physical changes in the character of the formation. Thus, the spontaneous potential log gives a general indication of whether a formation is permeable or impermeable, a limited amount of information concerning the nature of the fluids in a formation, and generally defines the dividing line between a permeable and impermeable formation thus permitting correlation of such a formation from one well to another over a considerable distance.

The other major electrical characteristic which is generally measured in well logging is the resistivity of a section of the subsurface. Rock formations, except, for example, massive solidified ore beds and graphitic beds, are capable of transmitting an electrical current only by means of the absorbed water which they contain. They would be nonconductive if they were entirely dry but the absorbed water, containing dissolved salts, constitutes an electrolyte capable of conducting current. Therefore, the more electrolyte contained in a formation and the richer this electrolyte in dissolved salts the greater the conductivity and therefore the lower the resistivity of the formation. Fresh water, for example, has only a small amount of dissolved salts and is therefore a poor conductor of electrical current. Salt water, with a large amount of dissolved salt, is a good conductor. Electrical logging practice is to measure not the conductivity but its reciprocal electrical resistivity. Resistivity can be defined as the resistance of a volume of rock having a unit of length and a unit of cross section. The resistivity of the rock is expressed in ohms per meter squared per meter or ohmmeters. This has been found a convenient unit for practical purposes and measurements may range anywhere between a fraction of an ohm and several thousand ohms. The volume or, more accurately, the location of the rock in which resistivity is measured is generally determined by the character of the measuring apparatus. Generally, four electrodes are utilized, two for passing an alternating current through the earth formation and two for measuring the potential across a section of this formation. By measuring the current flow with an ammeter and the potential with a voltmeter and applying Ohm's law the resistivity can be determined. There are two basic types of resistivity measuring devices. The first of these is termed the normal device which comprises a generator at the surface of the earth, an electrode lowered into the bore hole and a return electrode grounded at the surface of the earth. To measure the potential, a second electrode is spaced in the bore hole a predetermined distance from the generating electrode and another measuring electrode is grounded at the surface of the earth. Since the two measuring electrodes are spaced a wide distance apart the measurement is made in a generally hemispherical section of the earth extending from the surface to the mid-point between the generating and the measuring bore hole electrodes. The second resistivity logging configuration, known as a lateral device, also has a generating electrode in the bore hole and one at the surface but both measuring electrodes are located in the bore hole and spaced a predetermined distance apart and from the current electrode. When the potential is measured with this type device, the resistivity is measured in an annular sphere having a thickness equal to the spacing of the measuring electrodes from one another and having the bore hole current generating electrode as the center of the sphere. Obviously, by adjusting the spacing of the electrodes of either the normal or lateral in the bore hole, variations in the location or extent of the formation investigated can be made. Also various combinations of electrodes and additional electrodes can be utilized to obtain other helpful information. However, the resistivity log has primarily a twofold purpose, one to locate and determine the boundaries of all resistive formations, the other to determine the fluid content both qualitatively, and quantitatively. The first condition is achieved best in the normal device by a short electrode spacing between the current and the measuring electrodes and the second by using longer spacing to minimize the effects of drilling fluid resistivity, the diameter of the bore hole and the degree to which drilling fluid has invaded the zone. The lateral device, for the spacing commonly employed, is usually adequate to minimize the effect of the invaded zone and at the same time indicate the position of resistive zones.

Generally, the spontaneous potential curve and anywhere from one to three resistivity curves (with different spacings of electrodes or reversal of attitude) are recorded simultaneously and side by side on the same graph. With this information the logs may be used to correlate particular formations from one well to another spaced over a considerable geographical area. As previously indicated, the spontaneous potential curve usually indicates permeable formations containing saline, interstitial water by a marked negative anomaly. Formations containing fresh, interstitial water on the other hand are usually indicated by their lack of an SP anomaly or by a positive anomaly. These logs also permit one to obtain precise information indicating the depth below the surface of particular formations. Changes in the physical characteristics of the formation can also be studied as an aid in certain exploration problems. As previously indicated, the thickness of a given formation can usually be determined and therefore the net productivity of oil or gas reservoirs and the like. Finally, it is also possible in many cases to distinguish between an oil- or gas-containing formation and a water-bearing formation to make a quantitative determination of the percentage of void space in the formation and, to some extent, the amount of void space which is not filled with saline water but in all probability contains oil or gas. Thus, the electrical logging techniques just described can be seen to be capable of general delineations of the location of certain types of formations, the general character, that is, whether permeable or impermeable, the fluid content of the formation, and whether this fluid content is highly resistive or nonresistive and, therefore, whether it is salt water or some other material. However, it is most significant that these techniques do not in any definitive way indicate the nature or chemical characteristics of the formation or the fluids contained therein. It should also be recognized that the lack of information concerning the composition of a formation makes such electrical logging techniques quite inadequate when one is exploring for deposits of solid materials such as coal, lignite, oil shale and tar. It is still, therefore, a predominant practice in such exploration to relay upon sampling or coring the actual formation, recovering samples and chemically analyzing the samples.

It is therefore an object of the present invention to provide an improved method and apparatus for indicating the location and nature of subterranean materials.

Another object of the present invention is to provide an improved method and apparatus for electrically determining the location and nature of subterranean materials.

Another and further object of the present invention is to provide an improved method and apparatus for electrically determining the depth below the surface of the earth of materials forming the walls of a bore hole, determining the nature of such materials and correlating particular materials from one bore hole to another over an extended geographical area.

A further object of the present invention is to provide an improved method and apparatus for locating subterranean organic materials.

Yet another object of the present invention is to provide an improved method and apparatus for the location of subterranean coal deposits.

A further object of the present invention is to provide an improved method and apparatus for locating subterranean coal deposits and indicating the purity of such deposits.

These and other objects and advantages of the present invention will be apparent from the following detailed description when read in conjunction with the drawing, wherein:

FIGURE 1 is a schematic diagram partially in section of an apparatus useful in the practice of the present invention; and FIGURE 2 is a reproduction of electrical measurements made in accordance with the present invention correlated with a lithologic sample log.

Referring to FIGURE 1 of the drawings, 2 designates a subsurface earth formation into which a bore hole 4 has been drilled. Disposed in bore hole 4 is a liquid 6, which will normally be the heavy drilling fluid or mud employed in the drilling of the bore hole. Lowered into bore hole 4 by an appropriate sheave or other lowering and measuring device is a weighted electrode 8. Electrode 8 is lowered into the bore hole on the end of an insulated cable 10 which leads from the surface instrumentation to the down-hole electrode. Located adjacent the surface of the earth and also adjacent the mouth of the well bore is a second electrode 12 which is buried or otherwise grounded at the surface. Since the well fluid 6 is generally an electrically conductive fluid and the earth formation 2 contains conductive materials it is to be seen that by appropriate instrumentation a current may be passed between electrodes 8 and 12 through well fluid 6 and earth 2 and also that the resistance, voltage, or current between these two electrodes can be measured. As previously pointed out, various other arrangements of the electrodes can be utilized to pass current through the bore hole fluid and the earth and to make the various measurements. For example, rather than having a common surface electrode 12 the source of current may be grounded on a separate surface electrode. In addition, rather than measure the potential across the large segment of the earth 2 which is encompassed between electrodes 8 and 12, both measuring electrodes may be disposed in well bore 4. By this arrangement a substantially different section of the earth formation is measured. Also, rather than utilizing a common electrode 8 for the charging current and the measuring instrumentation, it is possible to use separate current and potential electrodes in well bore 4. This is true for both the situation in which one potential or measuring electrode is in the well and the other is at the surface and wherein both potential or measuring electrodes are in the well. The former arrangement is what has previously been referred to as the normal device while the latter was previously referred to as the lateral device. In short, any of the previously known prior art electrode arrangements which have heretofore been utilized in the measurement of self-potential and conductivity or resistivity in electrical well logging may be utilized to make the measurements which form the basis of the present invention. In the surface instrumentation, an appropriate oscillator 14 is utilized to pass a current through the circuit formed by the electrodes 8 and 12 and completed by the bore hole fluid 6 and earth 2. While this method of applying a potential or passing a current through the earth is conventional in the electrical well logging art, the signal impressed on the earth by oscillator 14 is not conventional. Specifically, oscillator 14 is designed to produce a low-voltage pulsating DC current rather than the usual high-voltage AC current which has heretofore been utilized when conventional resistivity measurements are made. For reasons which will be pointed out hereinafter, the pulsating DC current permits the measurement of substantially different quantities or phenomena than those heretofore measured in the electrical well logging art. The pulsating DC current may be a plurality of positive pulses having a frequency higher than 50 c.p.s. and preferably in the neighborhood of 275 to 300 cycles per second. The impressed potential is also of low magnitude since it has been found that a signal of high magnitude, such as that heretofore used in the conduct of resistivity logging operations has been found to mask the measurements made in accordance with the present invention. In a typical situation, the impressed voltage will be between about 50 to 200 millivolts. In any event, electrode 8 emits a plurality of positive or negative pulses depending upon the nature of the source 14. The ionization measurements, referred to herein, can then be made by an appropriately polarized, DC potentiometer 16. The measured direct current is passed to an appropriate strip chart recorder 18 which records the measured value continuously with respect to the depth location of electrode 8 in well bore 4. It is important in the present measurement that measuring device 16 be oppositely polarized with respect to the pulses emitted by electrode 8. Accordingly, when electrode 8 emits positive pulses, as in the preferred embodiment, measuring device 16 is negatively polarized. Conversely, if electrode 8 emits negative pulses measuring device 16 would be positively polarized. Such polarization is accomplished by means of rectifier 20 which is disposed in advance of measuring instrument 16. The rectified signal is amplified by means of amplifier 22 and then passed to measuring instrument 16. Utilizing the same source of current, a novel resistivity measurement is also made in accordance with the present invention. This novel measurement, as previously implied, stems from the use of a low magnitude pulsating, DC signal to energize the earth, as opposed to the conventional high voltage AC normally used in making resistivity measurements. In any event, resistivity is measured by a conventional resistivity measuring element 24 which includes the usual current and potential measuring circuits designed to produce an output directly readable as resistivity. Resistivity measuring means 24 is preceded by an AC amplifier 26. The output of measuring instrument 24 is also passed to strip chart recorder 18 where it is simultaneously recorded, side by side, with the ionization potential. Still further definitive information can also be attained, in accordance with the present invention, by also measuring the self-potential or spontaneous potential with the electrodes 8 and 12. For this purpose, a conventional DC amplifier 28 amplifies the signal to a conventional DC measuring instrument 30. The output of measuring instrument 30 is fed to strip chart recorder 18 where it is simultaneously recorded with the other two measurements to produce a three-curve chart plotted against bore hole depth. It has also been discovered, in accordance with the present invention, that by disposing a blocking condenser 32 in the ionization potential circuit, additional information concerning the lithologic or chemical constituency of the subsurface formation may be obtained. Blocking condensers 32 and 34 isolate the self-potential measurement and prevent paralled loading, while condenser 32 specifically prevents the DC of the self-potential measurement from being recorded as a component of the pulsating DC ion measurement During the logging operation, as the carbon content or quality of a coal bed, or insoluble hydrocarbons in an oil-bearing zone increases, and consequently their solubilities in water decrease, there is a decided drop in the ionization potential recorded, and it is possible to obtain what appears to be a substantially linear measure of the carbon content of the earth formation and to thereby produce a log clearly delineating not only the location of a carbonaceous material, such as, coal, or oil, but showing its relative purity or quality.

The foregoing also applies to fresh-water bearing strata, which exhibit a drop in ion potential, as in fresh water there are few dissolved materials.

FIGURE 2 illustrates a typical log obtained in the practice of the present method. As labeled, the recorded plots were made continuously versus the depth location of the down hole electrode, such as, electrode 8 of FIGURE 1. These curves represent the self potential or spontaneous potential curve usually recorded in electrical logging operations, a resistivity curve, which is abnormal to the extent that an entirely different exciting current was utilized, and, finally, the middle curve, which is referred to herein as the ionization potential curve. Immediately beside this set of curves is a lithologic legend obtained by actual sampling in the interval through which the log was made.

While it can be seen from the general character of the self potential and the resistivity curves that some variation in lithologic character takes place in the interval from 60 feet to about 95 feet, these two curves simply show a gross interval without any basis for defining individual beds, the separating shales and the like. While the spontaneous potential curve indicates minimums opposite some of the coal seams and maximums opposite the shales and bentonites, these variations are far from consistent and are not defined by sharp breaks where the lithology changes. Accordingly, it can be concluded from the spontaneous potential curve that the spontaneous potential in this particular instance showed widely varying degrees of porosity or permeability and the probability of a significantly different formation in the interval from 60 to 95 feet. The resistivity curve is substantially more informative in that a minimum appears to be shown generally correlatable with the base of each coal seam. This is generally consistent throughout the length of the curve although there are several instances where a minimum appears in the middle of a coal seam. However, to the extent that this curve aids in defining the base of the coal seams, it does provide definitive information. It should be noted, however, that the maxima of the resistivity curve are all of substantially the same level and therefore indicate only the presence, or possible presence, of the coal seams but nothing more concerning the character of the coal seams. Turning now to the ionization potential log, it is to be observed that, if one draws an arbitrary average and utilizes this as a base line, as shown, the bottom of each seam is clearly delineated by a crossover of this base line as the measured voltage drops from a maximum to a minimum. As a matter of fact, these crossovers appear to be so well defined that they seem to give a better indication of the exact positions and thicknesses of the seams than does the sample log. For example, relating the ionization curve crossover to the sample over the interval of 71.5 to 73 feet it appears from the log that the depth from which the sample was taken was mismeasured or miscalculated and that actually the bottom of this seam is probably closer to 72 feet. Similarly, in the interval from 73.5 to 78 feet it appears from the ionization potential curve that the bottom of this seam should be at about 76.5 feet and thus that the sample log indicates the seam is slightly thicker than it really is. The same applies for the seam shown at the interval between 85.5 and 89 feet. The actual bottom of the seam appears to be closer to 88 feet and, thus, again, the seam is somewhat thinner than the sample log would indicate or at least the base of the sample log is too low. While these are, of course, experienced guesses concerning the actual situation and absolute proof can only be obtained by rather extensive sampling or coring operations, these conclusions are fortified to a very great extent by the resistivity curve and, to some lesser extent, by the spontaneous potential curve. Thus, as indicated, the ionization potential curve appears to very clearly define the limits of coal seams and thus interpretation is greatly aided by running it along with a resistivity log and to a more limited extent with the spontaneous potential log.

Of even greater significance is that the ionization potential log also appears definitive of the purity or quality of the coal in a given seam. It has been found possible when utilizing the ionization potential log, to at least indicate a relative degree of purity among the various seams shown on a given log. In other words, if the highest maximum reached is considered to be 100% pure coal then a maximum halfway between this value and the base line indicates coal 50% as pure as the first seam. This has generally been confirmed by coring and sampling in wells which have been logged with the ionization logger. It is, of course, also possible that with substantially more experience a given maximum can actually be related to a percentage purity based on a standard excitation voltage. Present experience has shown that the optimum excitation voltage will vary between 50 to 500 mv., depending on the materials being investigated. Generally speaking, better definition will be obtained in high resistivity formations with a lower excitation voltage, while the opposite seems to hold with lower resistivity formations. In any event, however, consistent comparative degrees of purity in a given area have been indicated by the log. As previously indicated, it also has been found that the indications of the quality or purity of the organic bed are greatly aided by the utilization of the ionization condenser, such as condenser 32 of FIGURE 1. By the utilization of this blocking condenser in the measuring circuit it has been found that the ionization potential log is more definitive of quality than a log taken without the condenser in the circuit.

While it is not intended to be limited to any particular theory of operation, it is believed that the following theory explains the operation of ionization potential log. As indicated, the log appears to be definitive of organic beds, such as coal, tar sands, and the like. Such organic beds are normally more acidic than surrounding shales and sands. As a result, the organic beds have a larger available hydrogen ion concentration, as well as a larger hydroxyl ion concentration, than the inorganic beds. In addition, both the hydrogen ions and hydroxyl ions have high mobilities, many times greater than the mobility rates of other ions commonly found in solution. In addition, the electrolytic solution pressure is comparatively higher for the hydrogen ions and this coupled with the greater mobility of the hydrogen ions appears to indicate that what is really being measured by the log is the available hydrogen ion concentration. It also appears that, along with the hydrogen ion concentration, there is a certain degree of ionization of impurities contained in the organic deposit. These mineral impurities appear to, on a quantitative basis, shift the log to the left side whereas a lesser degree of ionization of either the material being measured or its contained impurities causes a sharp shift to the right. As indicated earlier, at the base of a given organic bed the log returns to the base line. Specifically, after having passed through an organic bed where the hydrogen ion is predominant the increased solubility of mineral contaminants in the shale or other bed below causes the voltage to swing to the left sharply. Also, as indicated earlier, this sharp shift to the left and its crossover of the base line on the ionization potential curve also appears to correlate with a sharp minimum on the resistivity curve. However, the minimums of the resistivity curve do not alone appear definitive. This is true since organic beds can retain a high resistivity because they are nonpermeable or simply because they are inherently devoid of a conductive fluid.

It has also been determined through repeated use of the ionization log that the log is not affected by invasion of the bore hole fluid nor to any great extent by the character of the bore hole fluid or the relative time of measurement after the hole has been drilled. Consequently, the log appears to measure a section of the actual formation in much the same manner that a conventional resistivity log does, except, of course, that an entirely different quantity is measured.

Having described and illustrated the present invention, it is to be recognized that numerous modifications and variations will occur to one skilled in the art without departing from the basic invention involved herein. Accordingly, it is to be understood that the examples given, the apparatus illustrated and described, and the suggested variations are all by way of illustration and are intended only to exemplify the principles of the invention to one skilled in the art. Therefore, with this in mind, the present invention is to be limited only in accordance with the appended claims.

I claim:

1. A method for investigating subsurface earth formations traversed by a bore hole comprising: passing from within said bore hole a pulsating, direct current, electrical signal, having a preselected polarity, through said earth formations surrounding said bore hole; and detecting and measuring a pulsating, direct current, electrical signal, of polarity opposite to the polarity of said signal being passed through said earth formations, across at least a portion of said earth formations through which said signal is passed; said detection and measurement of said pulsating, direct current, signal of opposite polarity being made simultaneously with the passage of said pulsating, direct current signal of preselected polarity through said earth formations.

2. A method in accordance with claim 1 wherein the bore hole contains a conductive fluid and the pulsating, direct current signal of opposite polarity is measured in at least a portion of said conductive fluid.

3. A method in accordance with claim 1 wherein the pulsating, direct current signal passed through the earth formations is of positive polarity.

4. A method in accordance with claim 1 wherein the pulsating, direct current signal passed through the earth formations has an amplitude less than about 500 millivolts.

5. A method in accordance with claim 1 wherein the pulsating, direct current signal passed through the earth formations has an amplitude between about 50 and 500 millivolts.

6. A method in accordance with claim 1 wherein the pulsating, direct current signal passed through the earth formations has a frequency greater than about 50 cycles per second.

7. A method in accordance with claim 1 wherein the pulsating, direct current signal passed through the earth formations has a frequency of about 300 cycles per second.

8. A method in accordance with claim 1 wherein the pulsating, direct current signal passed through the earth formations has a frequency between about 275 and 300 cycles per second.

9. A method in accordance with claim 1 wherein the pulsating, direct current signal of preselected polarity is passed through the earth formations and the pulsating, direct current signal of opposite polarity is measured continuously while moving from one location in the bore hole to another.

10. A method for investigating subsurface earth formations traversed by a bore hole comprising: passing from within said bore hole a pulsating, direct current electrical signal, having a preselected polarity through said earth formations surrounding said bore hole; detecting and measuring a pulsating, direct current, electrical signal, of polarity opposite to the polarity of said signal being passed through said earth formations, across at least a portion of said earth formations through which said signal is passed; and measuring an electrical signal which is function of resistivity across at least a portion of said earth formations through which said pulsating, direct current signal is passed; said detection and measurement of said pulsating, direct current signal of opposite polarity being made simultaneously with the passage of said pulsating, direct current signal through said earth formations.

11. A method in accordance with claim 10 wherein the measurements of the pulsating, direct current signal of opposite polarity and the electrical signal which is a function of resistivity are made simultaneously with one another.

12. A method for investigating subsurface earth formations traversed by a bore hole comprising: passing from within said bore hole a pulsating, direct current, electrical signal, having a preselected polarity, through said earth formations surrounding said bore holes; detecting and measuring a pulsating, direct current, electrical signal, of polarity opposite to the polarity of said signal being passed through said earth formations, across at least a portion of said earth formations through which said signal is passed; and measuring electrical signals spontaneously generated in at least a portion of said earth formations through which said pulsating, direct current signal is passed; said detection and measurement of said pulsating, direct current signal of opposite polarity being made simultaneously with the passage of said pulsating, direct current signal through said earth formations.

13. A method in accordance with claim 12 wherein the measurement of the pulsating, direct current signal of opposite polarity and the electrical signals spontaneously generated are made simultaneously with one another.

14. A method for investigating subsurface earth formations traversed by a bore hole comprising. from within said bore hole a pulsating, direct current electrical signal, having a preselected polarity, through said earth formations surrounding said bore hole; detecting and measuring a pulsating, direct current, electrical signal, of polarity opposite to the polarity of said signal being passed through said earth formations, across at least a portion of said earth formations through which said signal is passed; measuring electrical signals spontaneouly generated in at least a portion of said earth formations through which said pulsating, direct current signal is passed; and measuring an electrical signal which is a function of resistivity across at least a portion of said earth formations through which said pulsating, direct current signal is passed; said detection and measurement of said pulsating, direct current signal of opposite polarity being made simultaneously with the passage of said pulsating, direct current signal through said earth formations.

15. A method in accordance with claim 14 wherein the measurements of the pulsating, direct current signal of opposite polarity, and the signal which is a function of resistivity are made simultaneously with one another.

16. Apparatus for investigating subsurface earth formations traversed by a bore hole comprising: at least two electrodes electrically coupled to said earth formations surrounding said bore hole, with at least one of said electrodes positioned within said bore hole; generating means adapted to generate a pulsating, direct current, electrical signal, having a preselected polarity, electrically coupled to said electrodes in a manner to apply said signal to said earth formations; and detecting and measuring means electrically coupled to at least a portion of said earth formations to which said signal is applied and adapted to detect and measure simultaneously with the application of said applied pulsating, direct current signal a pulsating, direct current, electrical signal of polarity opposite the polarity of said applied signal.

17. Apparatus in accordance with claim 16 wherein at least one of the electrodes is disposable in the bore hole and at least a second of said electrodes is located adjacent the surface of the earth.

18. Apparatus in accordance with claim 16 wherein the measuring means is electrically coupled to the earth formation by means of at least one electrode which is separate from the electrodes to which the generating means is coupled.

19. Apparatus in accordance with claim 18 wherein the electrode which coupled the measuring means to the earth is disposable in the bore hole.

20. Apparatus in accordance with claim 18 wherein one of a pair of electrodes couples the measuring means to the earth and one of said pairs is disposable in the bore hole and the other of said pairs of electrodes is adjacent the surface of the earth.

21. Apparatus in accordance with claim 16 wherein the generating means is a low voltage generator.

22. Apparatus in accordance with claim 16 wherein the measuring means is a polarized, direct current measuring instrument.

23. Apparatus in accordance with claim 16 wherein the measuring means includes rectifier means electrically oriented to block signals of the same polarity as the generated signal and to pass signals of a polarity opposite to the polarity of said generated signal.

24. Apparatus for investigating subsurface earth formations traversed by a bore hole comprising: at least two electrodes electrically coupled to said earth formations surrounding said bore hole, with at least one of said electrodes positioned within said bore hole; generating means adapted to generate a pulsating, direct current, electrical signal, having a preselected polarity, electrically coupled to said electrodes in a manner to apply said signal to said earth formations; first detecting and measuring means electrically coupled to at least a portion of said earth formations to which said signal is applied and adapted to detect and measure simultaneously with the application of said applied pulsating, direct current signal a pulsating, direct current, electrical signal of polarity opposite the polarity of said applied signal; and second measuring means electrically coupled to at least a portion of said earth formations to which said signal is applied and adapted to measure an electrical signal which is a function of the resistivity of said portion of said earth formations.

25. Apparatus for investigating subsurface earth formations transversed by a bore hole comprising: at least two electrodes electrically coupled to said earth formations surrounding said bore hole, with at least one of said electrodes positioned within said bore hole; generating means adapted to generate a pulsating, direct current, electrical signal, having a preselected polarity, electrically coupled to said electrodes in a manner to apply said signal to said earth formations; first detecting and measuring means electrically coupled to at least a portion of said formations to which said signal is applied and adapted to detect and measure simultaneously with the application of said applied pulsating, direct current signal a pulsating, direct current, electrical signal of polarity opposite the polarity of said applied signal; and second measuring means electrically coupled to at least a portion of said earth formations to which said signal is appied and adapted to measure electrical signals spontaneously generated in said portion of said earth formations.

26. Apparatus in accordance with claim 24 wherein the first measuring means includes means for isolating said first measuring means from the second measuring means.

27. Apparatus in accordance with claim 26 wherein the isolating means is a condenser.

28. Apparatus for investigating subsurface earth formations traversed by a bore hole comprising: at least two electrodes electrically coupled to said earth formations surrounded by said bore hole, with at least one of said electrodes positioned within said bore hole; generating means adapted to generate a pulsating, direct current, electrical signal, having a predetermined polarity electrically coupled to said electrodes in a manner to apply said signal to said earth formation; first detecting and measuring means electrically coupled to at least a portion of said earth formations to which said signal is applied and adapted to detect and measure simultaneously with the application of said applied pulsating, direct current signal a pulsating, direct current, electrical signal of polarity opposite the polarity of said applied signal; second measuring means electrically coupled to at least a portion of said earth formations to which said signal is applied and adapted to measure electrical signals spontaneously generated in said portions of said earth formations; and third measuring means electrically coupled to at least a portion of said earth formations through which said signals is applied and adapted to measure an electrical signal which is a function of the resistivity of said portion of said formations.

References Cited

UNITED STATES PATENTS

| 2,174,638 | 10/1939 | Schlumberger | 324—1 |
| 2,199,705 | 5/1940 | Karcher | 324—1 |
| 2,206,894 | 7/1940 | Silverman | 324—1 |
| 2,300,709 | 11/1942 | Smith | 324—1 |
| 2,184,338 | 12/1939 | Ennis | 324—1 |
| 2,190,321 | 2/1940 | Potapenko | 324—1 |
| 2,212,274 | 8/1940 | Martienssen | 324—1 |
| 2,569,625 | 10/1951 | Wyllie | 324—10 |
| 2,972,101 | 2/1961 | De Witte | 324—10 XR |

GERARD R. STRECKER, Primary Examiner

U.S. Cl. X.R.

324—10